US009685796B2

(12) United States Patent
Poirier

(10) Patent No.: US 9,685,796 B2
(45) Date of Patent: Jun. 20, 2017

(54) CURRENT BALANCING DEVICE FOR PARALLEL BATTERY CELLS IN AN ELECTRIFIED VEHICLE

(71) Applicant: FORD GLOBAL TECHNOLOGIES, LLC, Dearborn, MI (US)

(72) Inventor: Eric Poirier, Taylor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 197 days.

(21) Appl. No.: 14/714,878

(22) Filed: May 18, 2015

(65) Prior Publication Data

US 2016/0344203 A1    Nov. 24, 2016

(51) Int. Cl.
*H02J 7/00* (2006.01)
*B60L 11/18* (2006.01)
*H02J 7/34* (2006.01)

(52) U.S. Cl.
CPC ......... *H02J 7/0014* (2013.01); *B60L 11/1866* (2013.01); *H02J 7/34* (2013.01)

(58) Field of Classification Search
CPC ............................ H02J 7/0014; B60L 11/1866
USPC .................. 320/126, 134, 137, 149, 151
See application file for complete search history.

(56) References Cited

U.S. PATENT DOCUMENTS

| 4,502,000 | A | 2/1985 | Mashikian |
| 2013/0009602 | A1 | 1/2013 | Hoff et al. |
| 2015/0069830 | A1 | 3/2015 | Huang |
| 2016/0301221 | A1* | 10/2016 | Kaminsky ............. H02J 7/0014 |

FOREIGN PATENT DOCUMENTS

| CN | 203014662 U | 6/2013 |
| CN | 203674735 U | 6/2014 |
| CN | 203932181 U | 11/2014 |

* cited by examiner

*Primary Examiner* — Paul Dinh
(74) *Attorney, Agent, or Firm* — David B. Kelley; MacMillan, Sobanski & Todd, LLC

(57) ABSTRACT

A current equalizer is provided for first and second battery elements connected in parallel to supply a DC link. A first constant resistance carries a first current from the first battery element to the DC link. A first variable resistance is connected in parallel with the first constant resistance. A second constant resistance carries a second current from the second battery element to the DC link. A second variable resistance is connected in parallel with the second constant resistance. A balancer inversely adjusts the first and second variable resistances in response to relative magnitudes of the first and second currents. As a result, the total currents supplied from each battery element to the DC link are equalized because the effective total resistance in series with each battery element compensates for the difference in the internal battery resistances.

20 Claims, 4 Drawing Sheets

CURRENT BALANCING DEVICE FOR PARALLEL BATTERY CELLS IN AN ELECTRIFIED VEHICLE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to current balancing between parallel-connected battery strings in battery packs for electric vehicles, and, more specifically, to a self-adjusting circuit for pairwise balancing of the current from battery elements using a magnetic balance.

Electric drives for hybrid (i.e., gas-electric) vehicles and for fully electric vehicles require a DC power source. The source typically is comprised of a battery. Common battery types such as lithium ion (Li-Ion) use a large number of cells stacked together into a battery pack. The output voltage and/or current capability of the battery pack can be greatly increased over the voltage and current provided by a single cell. Stacking of the cells can be done in series, in parallel, or a combination of the two. For example, two or more strings of series-connected cells can be connected in parallel.

A parallel battery arrangement may be desirable because under certain conditions, battery elements (whether single cells or strings of series-connected cells) that are connected in parallel can deliver high current levels with less overall Joule heating (i.e., resistive losses) than when connected in series. Unlike a series connection which ensures that all cells carry the same magnitude of current, however, the current magnitude from different parallel battery elements can become unbalanced (i.e., unequal) due to differences between the DC internal resistances (DCIR) of the parallel elements. The battery cell or string of cells having a lower DCIR will carry a higher current which leads to resistive losses and an increase in parasitic chemical reactions within the battery cell(s). The charge capacity and ability to deliver power may be significantly degraded in the corresponding cells, adversely affecting battery life.

For the foregoing reasons, it has been important to balance the current (i.e., equalize the current magnitudes) between different parallel branches. But such balancing has been difficult because the DCIR values can vary with time and with exposure to different environmental conditions such as temperature. Complicated, expensive electronic circuits and controllers have been required for performing the current balancing.

SUMMARY OF THE INVENTION

In one preferred embodiment, the present invention uses amplified magnetic fields produced by battery currents to drive changes in a small variable resistance in order to balance the parallel currents. Two inversely-varied resistances derived from a potentiometer are connected in parallel with respective current carrying power cables associated with each cell string and in series with the respective cell string. When differences in current between each string arise (e.g., due to differences in their total DCIR), then the net magnetic fields induced around the power cables are also different. A rotatable permanent magnet is placed between the magnetic fields and is mechanically linked to a rotating shaft of the potentiometer. The magnetic fields exert a net torque on the magnet that is proportional to the current difference. The potentiometer is configured to dynamically increase the resistance being added in series with the string having the lowest DCIR so that the overall current in this string is reduced. Simultaneously, the resistance being added in series with the other string of cells (i.e., having the higher DCIR) decreases so that the overall current in this string is increased. The net result is a more even current distribution between two parallel strings.

The variable resistances can be controlled by a wiper which rotates on a resistive surface or track as a result of the torque exerted on the permanent magnet. The potentiometer may have three terminals, including two end terminals and a common (tap) terminal. Two inversely proportional resistance values are established according to the position of the wiper on the resistive track. The resistance between an end terminal and the common terminal will increase while the resistance between the other end terminal and the common decreases, and vice-versa. The ratio between these two resistances is modulated by the rotation of the permanent magnet, which in turn is determined by the difference in magnetic field resulting from the cell current imbalance to be corrected. The variable resistances are small and can be chosen to compensate expected variation in DCIR over the life of the battery. For an increased response to the induced magnetic fields, the permanent magnet may be placed in or near gaps in magnetic cores receiving the power cables (e.g., a high magnetic permeability soft iron core, such as Met-Glass). Various magnetic core geometries or configurations are possible to maximize response to field imbalances. The permanent magnet coupled to the potentiometer is made of a material with a magnetic coercive field chosen to maintain adequate performance under the surrounding demagnetizing field. The added variable resistances do not add resistive losses to the circuit since they are in parallel to the main power cables.

In one aspect of the invention, a current equalizer is provided for first and second battery elements connected in parallel to supply a DC link. A first constant resistance carries a first current from the first battery element to the DC link. A first variable resistance is connected in parallel with the first constant resistance. A second constant resistance carries a second current from the second battery element to the DC link. A second variable resistance is connected in parallel with the second constant resistance. A balancer inversely adjusts the first and second variable resistances in response to relative magnitudes of the first and second currents. As a result, the total currents supplied from each battery element to the DC link are equalized because the effective total resistance in series with each battery element compensates for the difference in the internal battery resistances.

DETAILED DESCRIPTION OF PREFERRED EMBODIMENTS

Figure 1:
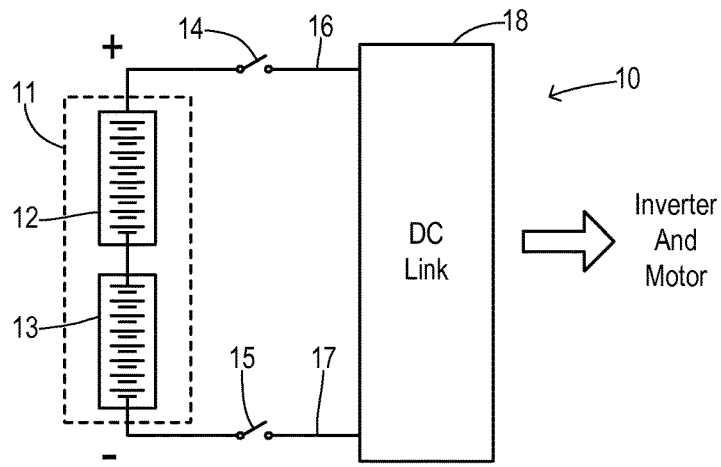
FIG. 1 shows a conventional series arrangement of battery cells.
Figure 2:
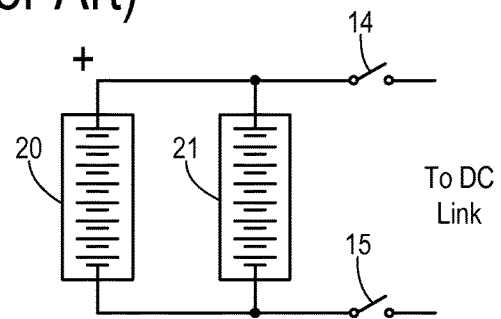
FIG. 2 shows a conventional parallel connection of series cell strings.

Referring to FIG. 1, an electric drive system 10 for a transportation vehicle includes a battery pack 11 with series-connected battery elements (e.g., cell strings) 12 and 13. Contactor switches 14 and 15 couple battery pack 11 to a positive bus 16 and negative bus 17, respectively, and to a DC link 18 for providing DC power to an inverter and motor/generator as known in the art. As shown in FIG. 2, it may alternatively be desirable to place battery elements 20 and 21 in parallel. The parallel elements provide a combined DC output to the buses via contactor switches 14 and 15 in order to deliver a high current level with less overall resistive losses (as compared to the series connection). Each battery cell or string of cells has a respective internal resistance (DCIR) which is in series with the current flowing through the respective battery element. In the parallel arrangement of FIG. 2, when the DCIR values of battery strings 20 and 21 diverge for any reason, then unequal current levels flow in strings 20 and 21. The string carrying a higher current is subject to increased degradation due to higher heat generation and associated chemical breakdowns.

Figure 3:
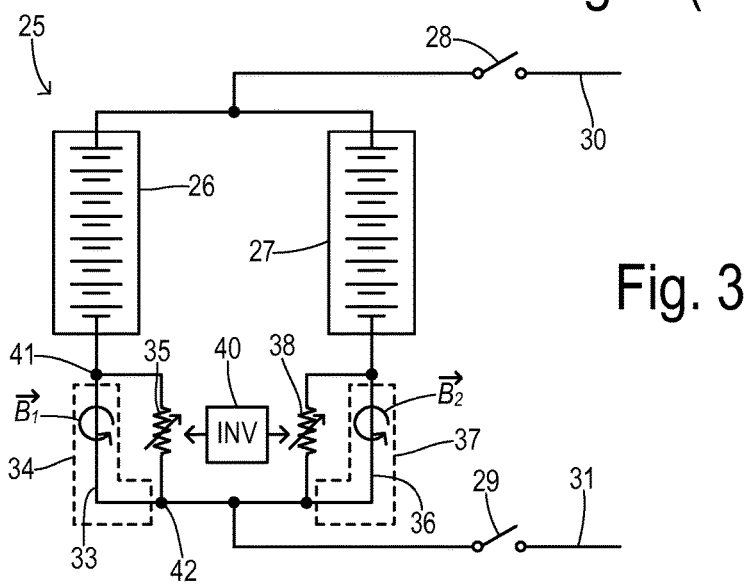
FIG. 3 is a schematic, block diagram showing a current equalizer of the present invention in conjunction with parallel battery elements.

FIG. 3 shows one embodiment of the invention wherein a battery pack 25 has battery elements 26 and 27 connected in parallel to supply DC power to positive and negative buses 30 and 31 via contactor switches 28 and 29. A current equalizer 32 is connected to battery elements 26 and 27 to compensate for any inequality in the DCIR values of battery elements 26 and 27 by providing variable resistances in series with each battery element and inversely adjusting the resistances in order to automatically cancel the difference between the DCIR values.

A power cable 33 (e.g., copper wire) is connected in series between battery element 26 and bus 31. A chosen segment of cable 33 provides a first constant resistance 34 which carries a first battery current from battery element 26. A first variable resistance 35 is connected in parallel with first constant resistance 34. The magnitude of first constant resistance 34 is determined according to the position of connection points 41 and 42 where parallel first variable resistance 35 is connected. Due to the low resistivity of the power cable material, connection points 41 and 42 may need to be separated by several feet. Similarly, a power cable 36 is connected in series between battery element 27 and bus 31. A chosen segment of cable 36 provides a second constant resistance 37 which carries a second battery current from battery element 27. A second variable resistance 38 is connected in parallel with second constant resistance 37. By controlling the magnitude of the variable resistances 35 and 38, the combined resistance of the constant and variable resistances in each parallel circuit counteracts differences in the internal resistances of battery elements 26 and 27. More specifically, where $R_1$ and $R_2$ are the internal resistances (DCIR) of battery elements 26 and 27, $R_W$ is the constant (intrinsic) wire resistance (i.e., resistances 34 and 37 are assumed to be equal), and $R_{V1}$ and $R_{V2}$ are the corresponding variable resistances 35 and 38), current balancing is achieved by adjusting the variable resistances to satisfy the following:

$$R_1 + \frac{R_W \cdot R_{V1}}{R_W + R_{V1}} = R_2 + \frac{R_W \cdot R_{V2}}{R_W + R_{V2}}. \quad \text{(Equation 1)}$$

Real time adjustment of the variable resistances is necessary during vehicle operation in order to handle uneven cell degradation during normal use.

Figure 4:
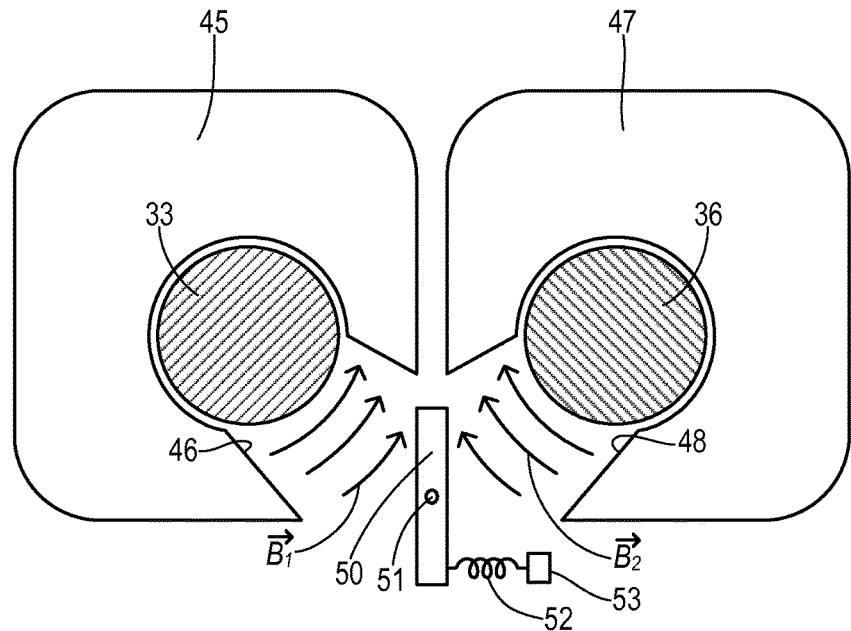
FIG. 4 is a plan view showing magnetic cores and a rotatable permanent magnet according to one preferred embodiment.
Figure 5:
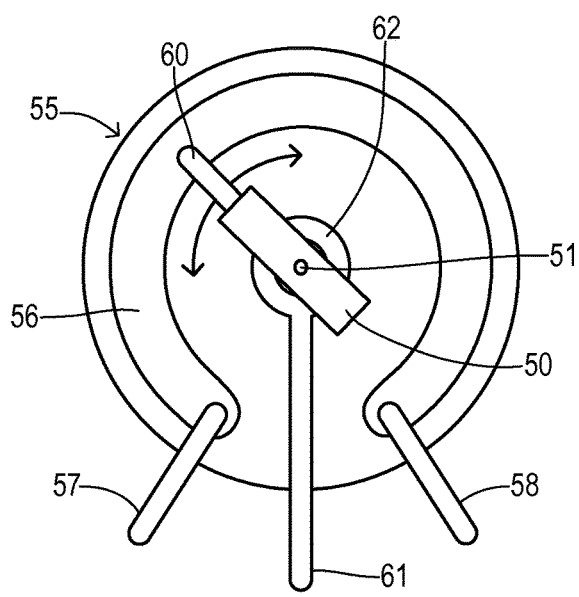
FIG. 5 depicts a potentiometer linked with the rotatable permanent magnet.

An inverse controller 40 is connected to variable resistances 35 and 38. In one preferred embodiment, inverse controller 40 responds to differences in magnetic fields $B_1$ and $B_2$ induced by power cables 33 and 36 in order to achieve the balance defined in Equation 1. A corresponding magnetic circuit is shown in FIG. 4 wherein the magnetic fields induced around power cables 33 and 36 are concentrated by magnetic cores 45 and 47. Cables 33 and 36 extend through parallel bores of cores 45 and 47 and are oriented to provide current flow in opposite directions so that induced magnetic fields $B_1$ and $B_2$ are oriented in the same direction in the space between cables 33 and 36. Magnetic cores 45 and 47 have gaps 46 and 48, respectively, to expose the concentrated magnetic fields to a bar magnet 50 which rotates around an axis 51 in response to the relative strengths of magnetic fields $B_1$ and $B_2$. Rotatable magnet 50 is preferably a permanent magnet which is magnetized in a direction such that the nearer end of magnet 50 is attracted toward whichever induced magnetic field $B_1$ and $B_2$ is stronger. In one preferred embodiment, permanent magnet 50 is mechanically coupled to one end of a return spring 52 with its other end mounted to a fixed structure 53 to create a bias force that tends to return magnet 50 to its center position as shown in FIG. 4. The biasing or restoring force of spring 52 must be sufficient to overcome the frictional/inertial forces within a mechanical load linked to permanent magnet 50 (e.g., a potentiometer as described below). Alternatively, the biaser can be omitted. In that case, the frictional force between the moving and stationary parts could keep rotatable magnet 50 in place when electrical power is removed (e.g., as a visual indicator of the current imbalances for servicing).

For providing the inversely-controlled variable resistances, a potentiometer 55 is provided which includes a resistive track 56 extending between end terminals 57 and 58. A slider or wiper 60 is arranged for movement along track 56 and is connected to a tap terminal 61 via a conductor trace 62. A total resistance of track 56 between end terminals 57 and 58 is divided into two complementary resistances accessible between tap terminal 61 and each of the end terminals 57 and 58. Thus, a first variable resistance is taken between end terminal 57 and tap terminal 61, while a second variable resistance is taken between end terminal 58 and tap terminal 61. Depending on the rotational position of slider 60, each variable resistance can range from zero to the total maximum resistance $R_{Max}$ between end terminals 57 and 58. The sum of the two variable resistances is always equal to $R_{Max}$. At the halfway or center position of potentiometer 55, each variable resistance is equal to one-half of $R_{Max}$. Slider 60 is mechanically coupled to rotatable permanent magnet

50. Preferably, slider 60 and rotatable magnet 50 are mounted coaxially on the same shaft or axis 51, wherein the center position defined by the spring biaser corresponds to the center position of potentiometer 55. In an alternative embodiment, the slider and the magnet can be integrated as a single component (e.g., by providing a conductive coating along an outer, sliding surface of a bar magnet). While a rotating arrangement of the potentiometer and slider are shown, other arrangements can alternatively be used (e.g., wherein one or both of the slider and magnet are linearly movable).

Figure 7:
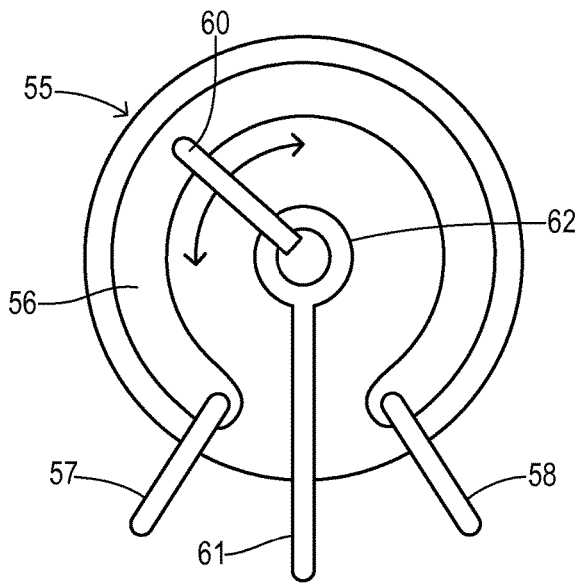
FIG. 7 shows the potentiometer in greater detail.

When the internal resistances of the two battery elements are equal, then 1) the induced magnetic fields are equal, 2) both the magnetic fields and the biasing force cooperate to position magnet 50 at its center position, 3) potentiometer slider 60 is at its center position where the two resistances are equal, and 4) the same resistance is added across each power cable so that the total currents from each battery element remain equal (i.e., balanced). At other rotational positions of magnet 50 and slider 60, tap terminal 61 is connected via trace 62 and slider 60 to a non-center position of track 56 (see FIG. 7).

Figure 6:
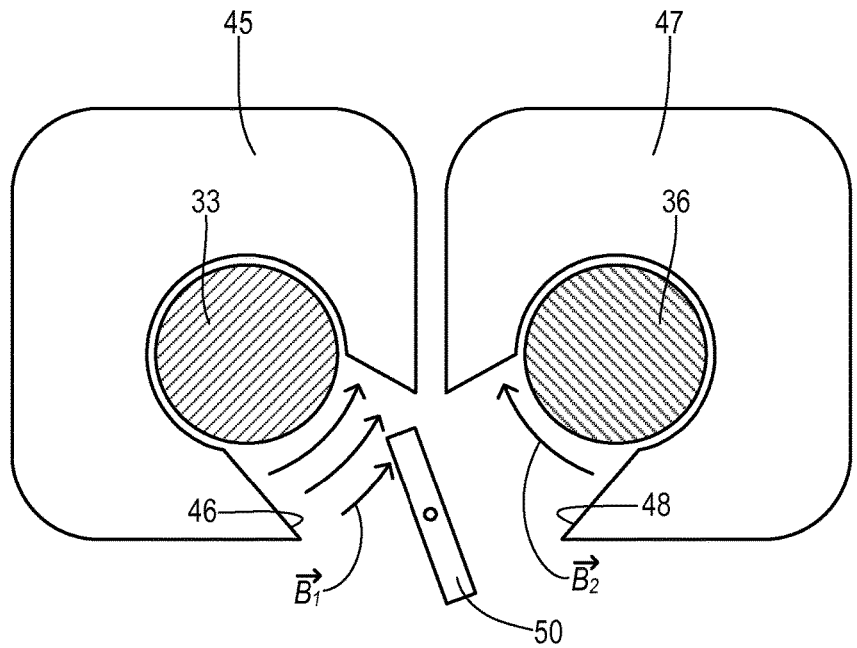
FIG. 6 illustrates deflection of the permanent magnet as a result of unequal currents due to unequal internal resistances of the parallel battery elements.
Figure 8:
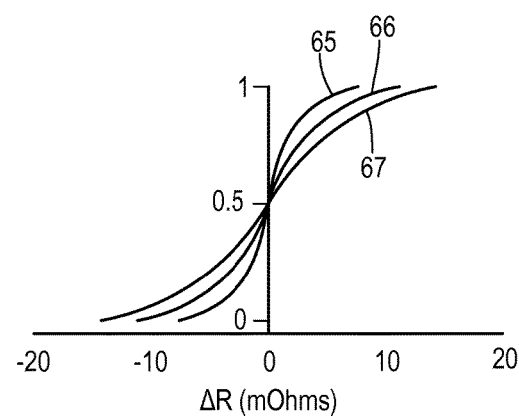
FIG. 8 is a graph showing different calibrations for the resistive track in the potentiometer.

When the internal resistances of the battery elements are not the same then the currents flowing through power cables 33 and 36 will not be equal. The unequal currents induce magnetic fields with different strengths. As shown in FIG. 6, when field $B_1$ is greater than field $B_2$ then permanent magnet 50 experiences a net torque that overcomes the bias force and rotates it toward field $B_1$. Consequently, slider 60 in potentiometer 55 is rotated by the same amount so that variable resistances 35 and 38 are inversely adjusted. Resistance track 56 is configured to vary the resistance according to rotational position such that the modification to the total parallel resistance combinations specified in Equation 1 compensate for the difference in internal resistance, thereby ensuring that the total currents from each battery element are equal. FIG. 8 shows different resistance curves 65, 66, and 67 obtainable using different bulk resistance properties for the track of resistive material and/or with different arrangements of the track. The vertical axis represents a variable a which is defined as the ratio of the length of a selected section of the resistor track (i.e., between one end terminal and the tap terminal) to the total resistance between end terminals. By selecting different values for the total end-to-end resistance, a curve can be obtained having a desired slope for relating a particular rotational position (i.e., corresponding value of α) to the resistance value that satisfies Equation 1. A typical wire resistance ($R_W$) for the electric drive of the invention may be about 100 mOhms with a length of about 1 meter. Since the typical changes in the DCIR are less than 100 mOhms, a variable resistance in parallel with the power cable can provide sufficient variability in the total parallel resistance to counterbalance any DCIR changes. In the event that the DCIR changes were greater or that the wire resistance was smaller (e.g., due to a shorter cable length), then the wire resistance could be supplemented by adding a discrete resistor in series.

Since the two variable resistances are inversely controlled so that their sum is always equal to $R_{Max}$, Equation 1 can be rewritten as:

$$R_1 + \frac{R_W \cdot \alpha R_{Max}}{R_W + \alpha R_{Max}} = R_2 + \frac{R_W \cdot (1-\alpha) R_{Max}}{R_W + (1-\alpha) R_{Max}}. \quad \text{Equation 2}$$

When there is a change in DCIR for one or both of the battery elements which results in a change to the difference between them (i.e., ΔR which is equal to $R_2-R_1$), then the value of α (i.e., the rotation of the potentiometer) necessary to balance the currents can be found using the relationship:

$$\frac{R_W \cdot \alpha R_{Max}}{R_W + \alpha R_{Max}} = \Delta R_2 + \frac{R_W \cdot (1-\alpha) R_{Max}}{R_W + (1-\alpha) R_{Max}}. \quad \text{Equation 3}$$

Figure 9:
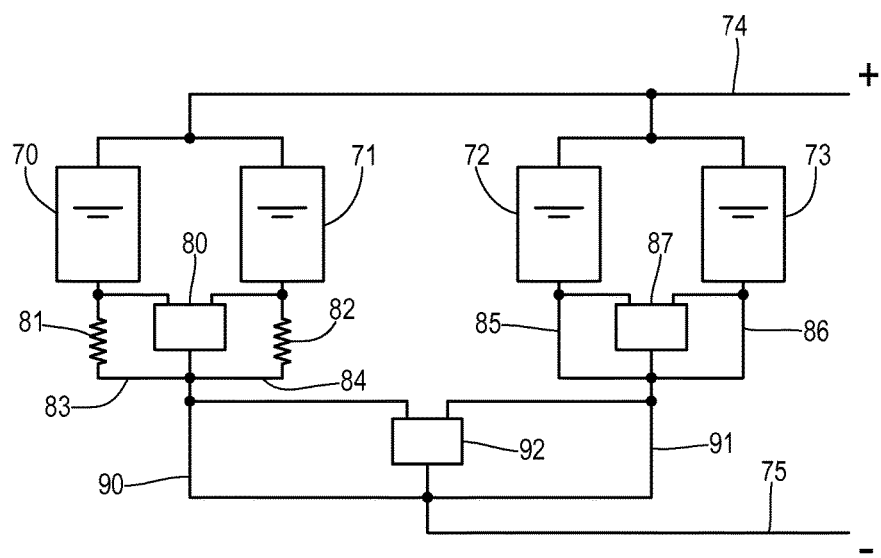
FIG. 9 is a block diagram showing a hierarchical use of the current equalizer to a greater number of parallel battery elements.

The foregoing embodiment equalizes currents from one pair of parallel battery elements by inversely adjusting parallel variable resistances in response to relative magnitudes of the currents delivered to respective fixed resistances. Such a current balancer can be extended to equalize currents over a greater number of parallel-connected battery elements as shown in FIG. 9 using a pairwise hierarchical arrangement of balancers. Thus, an electric drive system has four battery elements 70-73 connected in parallel between a positive bus 74 and a negative bus 75. A first pair of battery elements 70/71 has their currents balanced by a balancer 80. Discrete resistances 81 and 82 are shown in series with power cables 83 and 84, respectively, which can be used in the event that the wire resistance of cables 83 and 84 is insufficient to obtain a range of total resistance when combined with the variable parallel resistance of balancer 80 to compensate for the variability of the internal battery resistance changes.

Second pair of battery elements 72/73 are connected to series power cables 85 and 86 and have their currents balanced by a balancer 87. A total combined current from first battery pair 70/71 flows to a power cable 90, and a total combined current from second battery pair 72/73 flows to a power cable 91. Any pairwise imbalance between the combined internal resistances of the pairs of battery elements is compensated by a balancer 92 using the wire resistances of power cables 90 and 91 according to inversely-controlled variable resistances as described above.

The foregoing invention provides a current-balancing device with low cost and low complexity. It can be used with many different types of battery cells. Battery performance is significantly improved as a result of automatic current equalization which reduces cell degradation by minimizing overall heat generation.

What is claimed is:

1. A current equalizer for first and second battery elements connected in parallel to supply a DC link, comprising:
   a first constant resistance to carry a first current from the first battery element to the DC link;
   a first variable resistance connected in parallel with the first constant resistance;
   a second constant resistance to carry a second current from the second battery element to the DC link;
   a second variable resistance connected in parallel with the second constant resistance;
   a balancer inversely adjusting the first and second variable resistances in response to relative magnitudes of the first and second currents.

2. The equalizer of claim 1 wherein the balancer is comprised of a movable magnet exposed to magnetic fields induced by the first and second currents.

3. The equalizer of claim 2 wherein the magnet is comprised of a permanent magnet.

4. The equalizer of claim 2 wherein the balancer is further comprised of first and second magnetic cores with central openings through which the first and second currents pass, respectively, and wherein each core includes a gap exposing the movable magnet to the induced magnetic fields.

5. The equalizer of claim 2 wherein the first and second variable resistances are comprised of a potentiometer, wherein the potentiometer includes first and second end terminals connected to opposite ends of a resistive track, wherein the potentiometer further includes a tap terminal connected to a slider that is movable along the resistive track, and wherein the slider is mechanically coupled to the movable magnet for moving therewith.

6. The equalizer of claim 5 further comprising a biaser creating a bias force tending to return the slider to a zero position.

7. The equalizer of claim 1 wherein the first and second constant resistances are comprised of intrinsic resistances of first and second power cables coupling the first and second battery elements to the DC link.

8. The equalizer of claim 1 wherein the first and second constant resistances include discrete resistors connected in series with first and second power cables coupling the first and second battery elements to the DC link.

9. The equalizer of claim 1 for first, second, third, and fourth battery elements connected in parallel, comprising a hierarchy of balancers.

10. A current balancing method, comprising:
coupling two parallel battery elements to a DC link via respective power cables carrying first and second currents;
applying magnetic fields induced by the currents to generate a net torque on a rotatable magnet; and
moving a potentiometer wiper linked to the rotatable magnet to inversely vary respective variable resistances connected in parallel with the respective power cables so that the battery elements deliver total currents that are equalized.

11. The method of claim 10 further comprising:
applying a bias force to the wiper tending to return the wiper to a zero position where the variable resistances are equal.

12. The method of claim 10 further comprising:
concentrating the induced magnetic fields in first and second magnetic cores with central openings through which the first and second currents pass, respectively, and wherein each core includes a gap exposing the magnet balance to the concentrated magnetic fields.

13. An electric drive system for a transportation vehicle, comprising:
first and second battery strings each comprised of series-connected battery cells;
first and second power cables coupling the first and second battery strings together in parallel and to a DC link, wherein first and second constant resistances are present within the first and second power cables which carry first and second currents to the DC link, respectively;
a first variable resistance connected in parallel with the first constant resistance;
a second variable resistance connected in parallel with the second constant resistance; and
a balancer inversely adjusting the first and second variable resistances in response to relative magnitudes of the first and second currents.

14. The electric drive system of claim 13 wherein the balancer is comprised of a movable magnet exposed to magnetic fields induced by the first and second currents.

15. The electric drive system of claim 14 wherein the magnet is comprised of a permanent magnet.

16. The electric drive system of claim 14 wherein the balancer is further comprised of first and second magnetic cores with central openings through which the first and second currents pass, respectively, and wherein each core includes a gap exposing the movable magnet to the induced magnetic fields.

17. The electric drive system of claim 14 wherein the first and second variable resistances are comprised of a potentiometer, wherein the potentiometer includes first and second end terminals connected to opposite ends of a resistive track, wherein the potentiometer further includes a tap terminal connected to a slider that is movable along the resistive track, and wherein the slider is mechanically coupled to the movable magnet for moving therewith.

18. The electric drive system of claim 17 further comprising a biaser creating a bias force tending to return the slider to a zero position.

19. The electric drive system of claim 13 wherein the first and second constant resistances are comprised of intrinsic resistances of the first and second power cables, respectively.

20. The electric drive system of claim 13 wherein the first and second constant resistances include discrete resistors connected in series with the first and second power cables, respectively.

* * * * *